United States Patent [19]

Dellekamp

[11] Patent Number: 5,312,052

[45] Date of Patent: May 17, 1994

[54] METHOD FOR RECLAIMING FIBER REINFORCEMENT FROM A COMPOSITE

[76] Inventor: Michael D. Dellekamp, 798 S. Mount Comfort Rd., New Palestine, Ind. 46163

[21] Appl. No.: 891,931

[22] Filed: Jun. 1, 1992

[51] Int. Cl.$^5$ .................. B02C 19/12; B02C 23/12
[52] U.S. Cl. ................................. 241/24; 241/19; 241/80; 241/81; 241/159
[58] Field of Search ............... 241/19, 24, 80, 81, 241/159, DIG. 38

[56] References Cited

U.S. PATENT DOCUMENTS

| | | | |
|---|---|---|---|
| 1,027,274 | 5/1912 | Pichula. | |
| 1,689,679 | 10/1928 | Mauz. | |
| 2,200,576 | 5/1940 | Hawkins | 241/159 |
| 3,671,615 | 6/1972 | Price. | |
| 3,773,613 | 11/1973 | Lee et al. | |
| 3,890,220 | 6/1975 | Anderson. | |
| 3,933,086 | 1/1976 | Standing | 241/159 X |
| 4,109,871 | 8/1978 | Lohnherr | 241/24 |
| 4,586,658 | 5/1986 | Eisenegger | 241/19 |
| 4,598,872 | 7/1986 | Henne et al. | 241/19 |
| 4,630,781 | 12/1986 | Brown, Jr. et al. | 241/159 |
| 4,728,045 | 3/1988 | Tomaszek | 241/19 |
| 4,919,340 | 4/1990 | Gerber | 241/5 |
| 4,979,682 | 12/1990 | Voelker | 241/19 |
| 5,042,725 | 8/1991 | Grimmer | 241/19 |
| 5,071,075 | 12/1991 | Wiens | 241/19 |
| 5,080,291 | 1/1992 | Bloom | 241/19 |
| 5,084,135 | 1/1992 | Brooks et al. | 241/24 X |

FOREIGN PATENT DOCUMENTS 2702177 7/1978 Fed. Rep. of Germany ...... 241/159

OTHER PUBLICATIONS

"Economics of Recycling Thermosets" by G. N. Hartt and D. P. Carey on behalf of The SMC Automotive Alliance, 1992.

Primary Examiner—Eugenia Jones
Attorney, Agent, or Firm—Woodard, Emhardt, Naughton, Moriarty & McNett

[57] ABSTRACT

An apparatus and method for reclaiming fiber reinforcement material from cured SMC waste products provides a series of roller mill pairs having a differential speed capacity between paired rollers. The rollers impart a shearing and crushing force to the material which breaks the bond between the reinforcement fiber filaments and the resin binder while preserving the structural integrity of the filaments.

11 Claims, 2 Drawing Sheets

METHOD FOR RECLAIMING FIBER REINFORCEMENT FROM A COMPOSITE

BACKGROUND OF THE INVENTION

1. Field of the Invention

The subject invention relates generally to the field of reclaiming or recycling waste materials and, more particularly, to the reclaiming of fiber reinforcement from fiber reinforced plastic waste materials.

2. Description of the Prior Art

Historically, virtually all sheet molding composite (SMC) scrap generated by SMC molders has been sent to landfills for disposal. As the costs associated with landfilling increase however, it has become more economically feasible to consider alternative solutions for dealing with such wastes. Current methodology for reclaiming cured SMC waste involves a staged process of shredding, particalizing and either ultra fine grinding or through reduction by pyrolysis. Neither of these methods is entirely satisfactory from an economic standpoint in that the recyclable material produced is usable generally only as filler material in recycled plastic products. Since a substantial portion of the cured SMC waste is composed of glass fiber reinforcement having a substantially higher cost than filler material, there is a strong economic reasons to separate the fiber reinforcement from the binder material for reuse. While methods such as high speed impacting, hammermilling and grinding have been proposed to reclaim the fiber reinforcement, none of these methods is particularly satisfactory because the energy, maintenance and depreciation costs of these methods is very expensive and the reclaimed fibers are broken and have lost much of their original strength characteristics.

My invention solves the problem of how to efficiently separate fiber reinforcment from fiber reinforced plastic waste materials for reuse by using a roller mill system to accomplish the separation step. Roller mill systems generally have been known for many years. Over the past several generations roller mill technology has been applied to many commercial applications involving for example the size reduction of materials such as cereal grains and friable minerals. However, the use of roller mill technology in connection with the processing of fiber reinforced Plastic materials to effect separation of the fiber reinforcement represents a new application for this technology not heretofore suggested by its previous uses.

SUMMARY OF THE INVENTION

In one aspect, the present invention is characterized by a method for reclaiming fiber reinforcement material from a fiber reinforced plastic waste product while minimizing breakage of the reinforcement fiber filaments in the waste product. The method includes the steps of (1) shearing and crushing the waste product using a roller mill having at least one roller surface which imparts a shearing and crushing force to the waste product sufficient to break the bond between the fiber reinforcement and plastic resin in the waste product and (2) separating the fiber reinforcement filaments from the remainder of the cured fiber reinforced plastic waste product subjected to the shearing and crushing step.

Accordingly, it is an object of the present invention to provide an improved method and apparatus for reclaiming fiber reinforcement material from a fiber reinforced plastic waste product.

It is a further object of the present invention to provide a method and apparatus for reclaiming fiber reinforcement material from a cured fiber reinforced plastic waste product which minimizes breakage of the fiber filaments comprising the reinforcement material and which substantially preserves the strength characteristics of the fiber filaments. Because the glass fiber filaments are removed, the remaining filler material and resin binder is much less abrasive on the equipment required to further refine them and the energy requirements for reclaiming the remaining materials is reduced.

Related objects and advantages of the present invention will become even more apparent by reference to the following figures and detailed description.

DESCRIPTION OF THE PREFERRED EMBODIMENT

Figure 1:
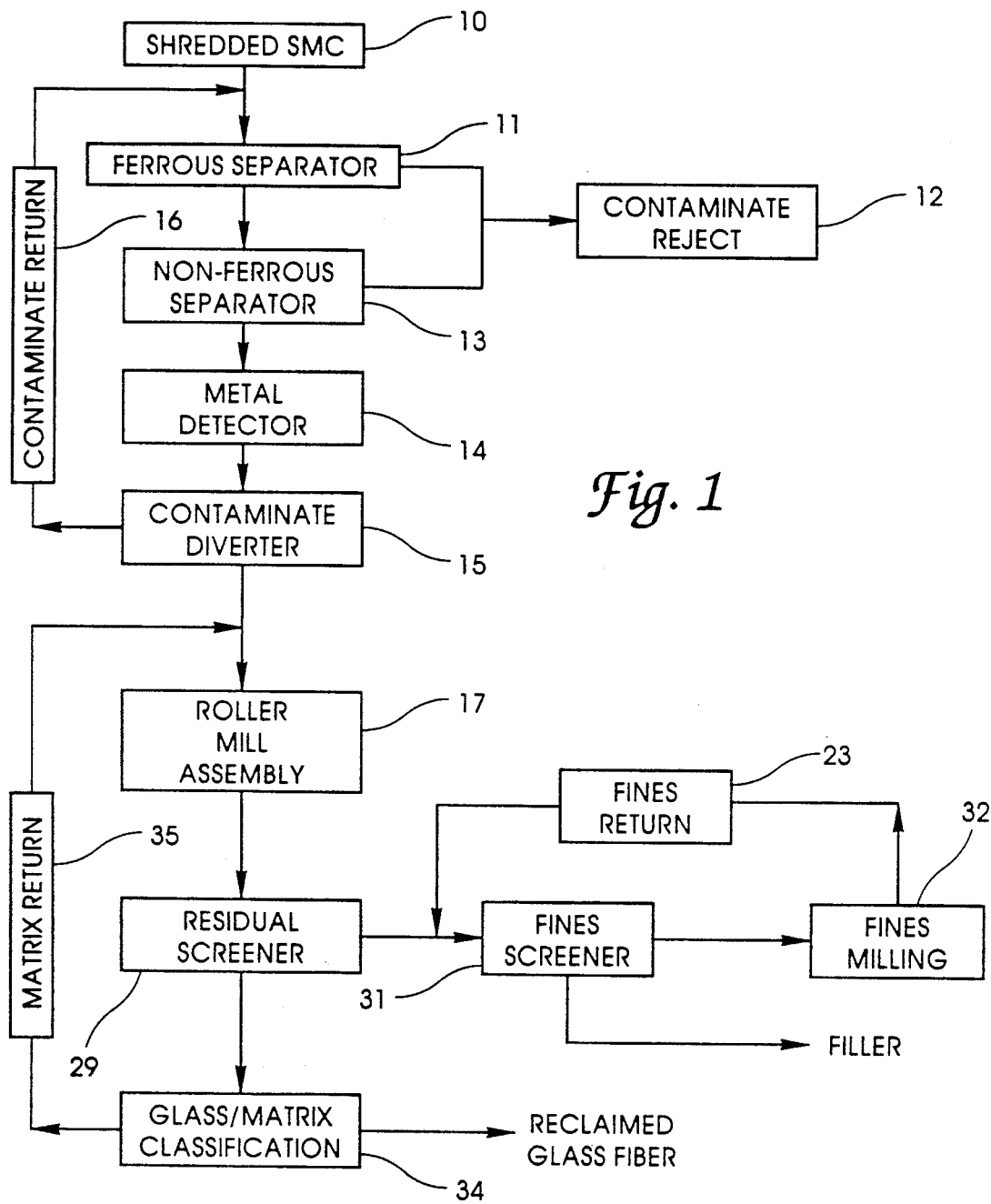
FIG. 1 is a block diagram illustration depicting the steps in the method of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In the manufacture of SMC products, scrap materials of several different types are generated. For example, there is unreinforced paste waste, reinforced material which does not meet moldability specifications, and trimmings. Each of these wastes are generated prior to curing the thermoset SMC material. In addition to these wastes, SMC molding also results in the generation of cured SMC waste materials. The SMC reclamation process of the present invention is particularly directed to cured SMC waste materials which include fiber filament reinforcement. Referring to FIG. 1, shredded SMC waste materials 10 will be shipped to the SMC reclamation facility from various SMC molders. Although the reclamation process could be modified to accept unshredded SMC, the bulk density of shredded SMC is approximately 3 to 6 times greater than for unshredded SMC, therefore it will typically be more economical to pre-shred the SMC waste material at the molder's facility prior to shipment to the SMC reclamation facility. The shredded SMC first enters a ferrous separator 11 in order to extract the majority of material which includes ferrous type metals. Any such materials are diverted to a contaminate reject storage area 12 for eventual off-site removal. That portion of the shredded SMC which passes through the ferrous separator 11 is then conveyed to a non-ferrous metal separator 13 for separation of material including non-ferrous type metals. The separated non-ferrous metal material is then conveyed to the contaminate reject storage area 12.

Material passing through the non-ferrous metal separator 13 is then exposed to a metal detector 14. Whenever the metal detector 14 detects metal, a diverter mechanism 15 will be activated to divert the metal containing material for conveyance via a contaminate return line 16 to ferrous metal separator 11 for further staged separation of the metal and non-metal material.

Figure 2:
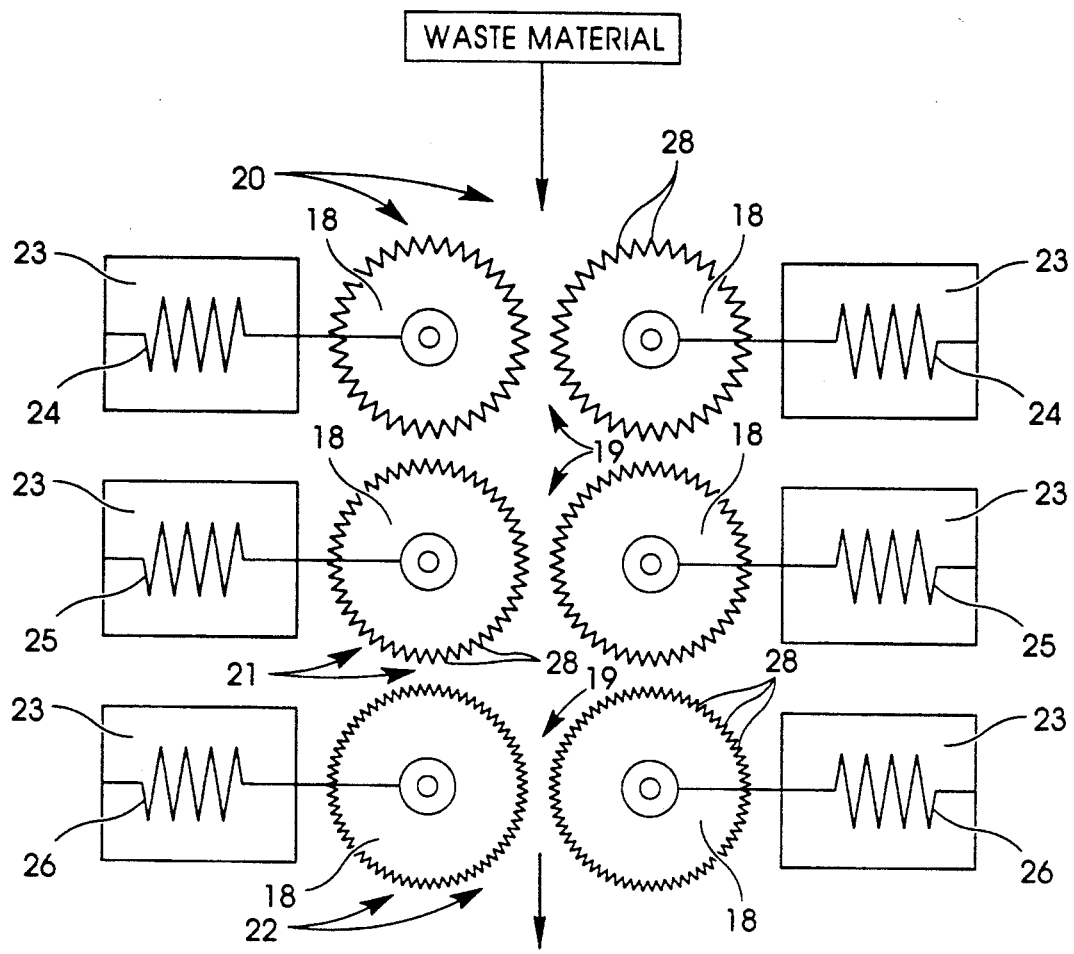
FIG. 2 is a schematic representation of the roller mill used in performing one of the steps of the present invention.

Material passing through the metal detector 14 is then fed into a roller mill assembly 17 which separates the fiberglass reinforcement from the cured thermoset resin binder and filler material in the SMC. Referring to FIG. 2, roller mill assembly 17 is seen to include a series of three pairs 20, 21 and 22 of vertically spaced apart rollers 18. The respective rollers 18 of each roller pair are aligned horizontally and spaced apart so as to define a gap 19 between the respective roller surfaces for passage of material therethrough. In addition, each of the roller pairs 20-22 are positioned so that the gaps 19 are vertically aligned relative to one another. Further, the size of the gaps 19 between each pair of rollers 18 is adjustable depending upon such factors as the characteristics of the material being processed therethrough, processing rate, etc. Preferably, the first or topmost pair of rollers 20 will have the largest gap or spacing therebetween with succeeding roller pair gaps 19 being progressively smaller. This arrangement provides a staged processing of material fed through roller mill assembly 17 so that larger material pieces are broken down first and succeeding roller pairs are able to process progressively smaller pieces of material with less risk of jam ups caused by oversized pieces.

In order to further reduce the risks of such jam ups, a spring overload safety tensioning mechanism 23 is provided with each roller pair 20-22. Safety tensioning mechanism 23 permits rollers 18 to move relatively away from one another to permit passage through gap 19 of oversize material when the force exerted on the rollers 18 exceeds an amount which has been determined to provide a suitable margin of safety to prevent excessive strain on the drive means. In the embodiment shown, this tensioning force is provided by spring pairs 24-26 associated with each of roller pairs 20-22, respectively. Preferably, the spring constant corresponding to the springs in each pair is the same whereas the spring constant for successive spring pairs is made progressively smaller. This arrangement ensures that oversize material passed through the first roller pair 20 will not become jammed in succeeding roller pairs having smaller gaps 19 and higher shaft speeds.

In addition to the spring type system shown other types of safety mechanisms may also be employed such as pneumatic or hydraulic actuated cylinders, etc.

Each of the rollers 18 is driven by a suitable drive means (not shown) which permits varying of the speed between rollers 18 in each roller pair as well as the speed between respective roller pairs. For example, the left roller 18 corresponding to topmost roller pair 20 may be driven at a lower speed than the corresponding right roller 18. This arrangement provides an abrading action on material passed between the rollers 18. This speed differential may be variably controlled to provide a greater or lesser abrading action as the material passes therethrough. Further, the roller speeds may be varied among the roller pairs. Thus for example, the slowest roller in roller pair 21 may be driven faster than the speed of the fastest roller in roller pair 20. This permits material to process through the second roller pair 21 at a rate not less than the first roller pair 20 in spite of the smaller gap 19 associated with roller pair 21.

Figure 3:
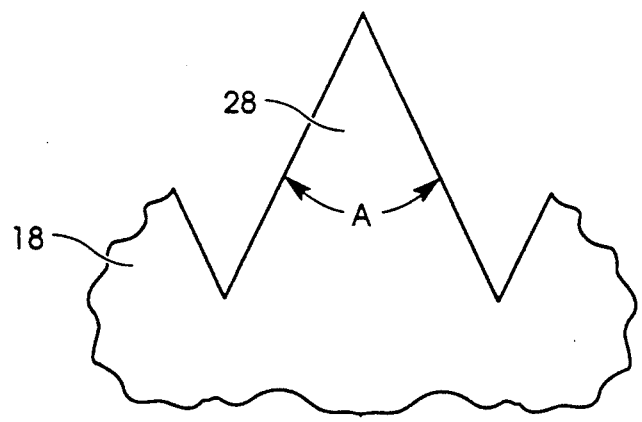
FIG. 3 is an enlarged fragmentary cross sectional view of one of the rollers of FIG. 2 showing the roller serrations.

Referring additionally to FIG. 3, each of the rollers 18 have identical diameters and each is provided with serrations 28 which extend substantially across the length thereof. As seen in FIG. 3 each of the serrations 28 has a cross sectional shape in the form of a pointed tooth. It is preferred that the included angle A between the sloped surfaces of serrations 28 be approximately 60-70°. It is desirable that the serrations 28 in the topmost pair 20 of rollers 18 be the largest sized of all roller pairs, since material size will be the largest at that point, with serrations 28 in succeeding roller pairs 21 and 22 being progressively smaller.

It should be appreciated that the roller mill assembly 17 as seen in FIG. 2 is not to scale, the spacing between rollers 13 and the size of the serrations 28 being for example exagerrated in size for purposes of clarity.

Material is fed into the space between the topmost pair of rollers 18 and moves downwardly under force of gravity through succeeding pairs of rollers 18. As the material advances through the roller mill assembly 17, it is crushed and abraded by the successive pairs of rollers 18. As the SMC material advances through the rollers 18 the rollers provide a crushing and shearing force which breaks apart the bond between the fiber filaments and resin binder. Thus, the roller mill assembly 17 provides a relatively low energy method of separating the glass fiber filaments from the binder resin in the SMC material and has a much lesser tendency to break fiber filaments than previous methods.

After passage through roller mill assembly 17, the material is then conveyed to a residual screener 29. Material having a size greater than the screen mesh size is retained on the residual screener 29. Material passing through the residual screener is classified as fines. The fines material will primarily include filler material such as calcium carbonate or clays and resin bonders that were degraded sufficiently by the roller mill assembly 17 to pass therethrough. In a preferred embodiment, residual screener 29 is a 30 mesh (Standard U.S. size) screen, although the screen size may be varied therefrom.

The fines are then processed through a fines screener 31. In the preferred embodiment, screener 31 is a centrifugal type screener having a very fine mesh screen with openings sized on the order of 50 microns. Material passing through this screen is considered suitable for resale as filler material. Alternatively, a staged fines screening process could be employed to permit density classification of the filler to increase its market value.

Fines not passing through the fines screener 31 are classified as oversize fines and are conveyed to a fines milling system 32 for reducing the size of the oversize fines. Material passing through the fines milling system 32 is then conveyed along fines return line 33 back to fines screener 31 for further screening. The fines milling system 32 may for example be a jet mill of the type sold by Fluid Energy of Plumsteadville, Pa., a disk and pin mill or turbine mil such as is sold by Kemutec of Bristol, Pa., or an air classifying mill such as is manufactured and sold by Jacobson Corporation of Minneapolis, Minn.

Material retained by residual screener 29 will comprise an oversize matrix of glass filaments and glass filaments attached to resin bonders. Material which still includes resin bonder will have a higher specific gravity than glass filaments alone and are separated by a glass-/matrix classification process 34 which employs an airstream to entrain the less dense glass filaments while allowing the higher density matrix material to fall out of the air stream.

Matrix material not entrained in the classification air stream is conveyed along a matrix return line 35 back to the roller mill assembly 17 for further processing. The material entrained during the classification step 34 constitutes a reclaimed glass fiber filament material which is suitable for reuse as reinforcement material by SMC molders.

Example

In an exemplary run, the left and right rollers 18 of the first pair 20 were driven at 150 and 190 rpms, respectively, whereas the left and right rollers of the second pair 21 were driven at 190 and 200 rpms, respectively, and the left and right rollers of the third pair 22 were driven at 220 and 220 rpms, respectively. Further, the gap 19 was set at 0.0625" for the first roller pair 20, 0.030" for the second roller pair 21, and 0.011" for the third roller pair 22. In addition, the roller tension for the first pair of rollers 20 was set at 250 p.s.i., whereas the roller tension for the second and third roller pairs was set at 100 p.s.i. and 40 p.s.i., respectively. Also, the serrations 28 in the roller pairs 20-22 were sized at 5, 20 and 45 serrations per inch, respectively. It has been found that this particular roller mill set up produces a separated fiberglass filament product acceptable for reuse by SMC molders. In addition, the following table represents the particle size distribution of a sample of the filler material obtained with this set up. Larger matrix material that bypassed the rollers, i.e., approximately 4% of the original material, was not included in the sample.

| U.S. Std. Mesh Size | Percent (%) |
| --- | --- |
| 4 | 0.7 |
| 6 | 1.8 |
| 8 | 5.1 |
| 12 | 10.2 |
| 20 | 28.4 |
| 25 | 6.1 |
| 30 | 7.4 |
| 35 | 2.8 |
| 40 | 5.7 |
| 50 | 5.3 |
| 60 | 2.0 |
| 80 | 5.1 |
| 100 | 3.2 |
| 140 | 3.9 |
| PAN | 12.2 |

While the invention has been illustrated and described in detail in the drawings and foregoing description, the same is to be considered as illustrative and not restrictive in character, it being understood that only the preferred embodiment has been shown and decscribed and that all changes and modifications that come within the spirit of the invention are desired to be protected. Thus, for example, while the detailed description specifically refers to the use of the process in connection with SMC waste materials, the method of the subject invention may also be used to reclaim fiber reinforcement from BMC (batch mold compound) waste materials, glass lay up, glass spray up, and vacuum bag fiber reinforced plastic waste materials.

What is claimed is:

1. A method for reclaiming fiber reinforcement from a cured fiber reinforced plastic waste product, comprising the steps of:

shearing and crushing said waste product using a roller mill having at least one roller pair which imparts a shearing and crushing force to said waste product sufficient to break the bond between fiber reinforcement filaments and plastic resin in the waste product while minimizing breakage of the reinforcement fiber filaments in the waste product; and separating the fiber reinforcement filaments from the remainder of the cured fiber reinforced plastic waste product subjected to said shearing and crushing step.

2. The method of claim 1 wherein said roller mill includes a plurality of pairs of rollers and said shearing and crushing step is accomplished by successively passing said waste product through said pairs of rollers.

3. The method of claim 2 wherein said roller mill includes a means for varying the speed between paired rollers to provide a speed differential therebetween, and wherein abrading of said waste product is accomplished simultaneous with said shearing and crushing step by varying the speed between paired ones of said rollers.

4. The method of claim 3 wherein metal material is removed from said waste product prior to said shearing and crushing step by passing said waste material through a ferrous metal separator and a non-ferrous metal separator.

5. The method of claim 4 wherein said separating step includes screening the waste product through a residual screener to provide a fiber reinforcement waste product component and a fines waste product component.

6. The method of claim 5 wherein after said residual screening step the fines waste product component is screened through a fines screener and the oversized fines waste product component is processed through a fines milling system and returned to said fines screener.

7. The method of claim 6 wherein after said residual screening step said fiber reinforcement waste product component is further classified to separate a matrix component therefrom, said matrix component being returned to said roller mill for further shearing and crushing.

8. The method of claim 3 wherein said shearing and crushing step is accomplished by three pairs of rollers, each of said rollers having a series of tooth shaped serrations extending along substantially the entire surface thereof.

9. The method of claim 8 wherein said serrations on successive ones of said roller pairs are progressively smaller in size.

10. The method of claim 9 wherein the speed of said roller pairs progressively increases.

11. The method of claim 10 wherein respective rollers in each of said roller pairs define a gap therebetween, with the size of said gaps progressively decreasing for successive downstream roller pairs.

* * * * *

UNITED STATES PATENT AND TRADEMARK OFFICE
CERTIFICATE OF CORRECTION

PATENT NO. : 5,312,052
DATED : May 17, 1994
INVENTOR(S) : Michael D. Dellekamp

It is certified that error appears in the above-identified patent and that said Letters Patent is hereby corrected as shown below:

In column 1, line 47, please change "Plastic" to --plastic--.

In column 3, line 53, please insert a comma after "employed".

In column 4, line 61, please change "mil" to --mill--.

Signed and Sealed this

Sixth Day of September, 1994

Attest:

BRUCE LEHMAN

*Attesting Officer*              *Commissioner of Patents and Trademarks*